Inventors
Hugh D. Guthrie
Carl P. Strand
Richard B. Olney
By Oswald H. Milmore
their Attorney Inventors
Hugh D. Guthrie
Carl P. Strand
Richard B. Olney
By Oswald H. Milmore
their Attorney

Patented June 29, 1954

2,682,394

UNITED STATES PATENT OFFICE 2,682,394

SPRAY GRID TRAY COLUMN WITH FLUID
DISTRIBUTION OR DRAWOFF TRAY

Hugh D. Guthrie, San Anselmo, Carl P. Strand,
El Cerrito, and Richard B. Olney, Oakland,
Calif., assignors to Shell Development Company, Emeryville, Calif., a corporation of Delaware Application December 12, 1950, Serial No. 200,432

20 Claims. (Cl. 261—113)

This invention relates to the art of contacting liquids with gases and resides in an improved column employing spray grid trays arranged in vertically spaced relation within an upright column to effect intimate contact between a gas and a liquid flowing countercurrently thereto, for example, to effect a mass transfer or exchange of components as is done in fractional distillation columns, gas washers, and other contacting devices, or to effect a chemical reaction. More particularly, the invention relates to columns wherein one or more of the spray grid trays are provided with means for establishing flow communication between a fluid at the tray and the outside of the column in a manner that will effect a desirable distribution of the fluids over the cross-section of the tray so as to stabilize the operation thereof. Such communications may be used either to supply a fluid, e. g., gas or liquid, to the tray or to withdraw a fluid therefrom.

Spray grid tray columns have a plurality of transverse trays having a plurality of grid bars extending over the entire or over a part of the tray area and providing a plurality of narrow, elongated slots between the bars, the slots being advantageously more or less uniformly distributed and having widths such that all slots of the same tray offer substantially the same resistance to the upward passage of gas per unit length of slot, and the slots constituting the only connection for the upward flow of gas through the trays. The trays are spaced apart vertically to divide the column into stages and provide intervening spray or contact spaces of appreciable heights (such spaces being either empty or provided near the top with entrainment-preventing devices, e. g., screens) wherein the gas and liquid are intimately contacted. Liquid flows downwards from tray to tray through the slots or through downcomers spanning two adjacent stages, in countercurrent to the ascending gas which flows through the slots at a velocity sufficient to retain a body of liquid on the grid and to spray liquid upwards into the supervening spray space.

Columns of the type described in the foregoing paragraph are operated within a definite operating range between a dispersion point and a load point. The significance of these points may be explained as follows:

Liquid fed to the top of the column drains through the slots and cascades rapidly from tray to tray without any appreciable build-up of liquid on the trays when no gas ascends through the slots or when the gas ascends at a moderately low velocity. As the gas velocity is increased a point is reached at which the gas interferes with the free passage of liquid and a continuous body of liquid is retained on the bars and a spray is thrown up; this condition corresponds to the dispersion point or lower operating limit. The gas flow rate corresponding to this condition is, of course, dependent upon the slot width, the aggregate area of the slots and the rate at which liquid is supplied. The dispersion point may, therefore, be defined as the region at which gas and liquid rates are just sufficient to cause an initial, small build-up of liquid on the trays. When the column is provided with a window this point can be identified visually by the onset of spraying and dancing of droplets on and above the tray. The dispersion point is further characterized by a sharp rise in the liquid hold-up on the tray and of the pressure drop through the column as the gas or liquid rate is increased. When the rate of gas flow is further increased an intense atomization of liquid is produced and a heavy spray is formed that rises well above the upper tray surface. When the gas rate is increased still further a point is reached at which the tray becomes inoperative due to flooding; this point is the load point or upper operating limit. This point is further marked by a sharp increase in liquid surges across the tray and by unstable operation.

Spray grid columns should be distinguished from cooling and gas washing towers employing drip laths or drip rails, wherein no upward spray is formed and wherein there is, consequently, no atomization of liquid. Such drip laths or rails are sometimes arranged as grate-like trays without vertical spacing or with insufficient vertical spacing to provide free spaces for the upward passage of atomized liquid and the gas, and/or the gas does not flow upwardly through the slots with sufficient velocity to build up a body of liquid above the grid bars. Such devices operate below the dispersion point.

The stable operation of spray grid tray columns requires that the counterflowing gas and liquid be substantially uniformly distributed over the cross-sectional area of the tray; this condition can be realized only when the effective liquid level on each tray is maintained reasonably uniform so that the tray everywhere offers about the same resistance to the upward flow of gas through the slots, and the pressure of the gas beneath the tray is substantially uniform. Poor distribution of one or of both fluids on a particular tray may cause similar maldistribution on several trays above or below the reference tray. When the depth of liquid on a tray is not uniform the gas tends to flow at a greater rate through the slots in regions of shallower liquid depths; contacting efficiency is reduced thereby in that an insufficient atomization of liquid is attained in regions of relatively lower gas velocities, while in regions of relatively higher gas velocities the liquid is thrown against the next higher tray and is partly carried into the adjoining higher stage by entrainment in the ascending gas. Moreover, the latter gas is not effectively contacted with a proportionate amount of liquid. Concomitantly, the liquid on the tray in regions of greater depth may pass down through the slots without being adequately contacted with the ascending gas. Variations in gas pressures on different portions of the under side of a tray also results in non-uniform gas flow, causing reduced contacting efficiency in the manner just described.

Maldistribution of the fluids may be attributed to three causes, assuming that the slots' widths are of uniform sizes and uniformly distributed over the tray: (1) There is a tendency for gas velocities to be greater at the central part of the column than near the wall thereof. (2) One or both of the fluids may be supplied to the column at locations or with velocity components that create non-uniform distribution. (3) Fluid may be withdrawn from the column in a manner to result in maldistribution of the remaining fluids. Fluids may be supplied or withdrawn from the column at the ends thereof and, additionally, one or more streams may be supplied and/or withdrawn at an intermediate level, depending upon the process in which the column is used. For example, in fractional distillation of a multi-component mixture, the latter may be introduced as a gas or liquid at one end of the column or at an intermediate point, and a product which is a concentrate of one or more components boiling at an intermediate part of boiling point range of the mixture may be withdrawn as a side stream at an intermediate level of the column as a gas or liquid. Non-uniform liquid depths on the trays are particularly severe when a liquid is added or withdrawn at an intermediate level without special precautions already when relatively minor proportions of liquid—such as 20% of the descending liquid—is added or taken off. Non-uniform gas pressures are similarly produced when gas is added or withdrawn at an intermediate level, particularly when a relatively large proportion—such as 40% or more of the ascending gas—is involved.

If distribution of fluids on a particular tray is good, then adjacent trays operate in a stable manner, assuming that the column is free from disturbing influences. Therefore, it is important from the standpoint of economics and performance to insure that the gas and liquid streams entering and leaving the column and throughout the column are distributed uniformly.

It is a general object of this invention to stabilize the operation of spray grid tray contacting columns by including therein a spray grid tray of modified construction that is adapted for the withdrawal or supply of fluid in a manner to promote uniform distribution of fluid.

A specific object is to provide an improved spray grid tray for gas-liquid contact columns that may be mounted either at an end of the column or at an intermediate level for feeding liquid thereto in a manner to promote uniform distribution of liquid. A further object is to provide an improved spray grid tray that may be similarly located and is suitable for feeding gas to the column in a manner to promote a uniform gas pressure acting on the tray.

Another specific object is to provide an improved spray grid tray for gas-liquid contact columns that is suitable for withdrawing liquid from the tray without unduly disturbing the distribution of liquid thereon, such tray being particularly useful when mounted at an intermediate level for withdrawal of a fraction of the liquid, but also applicable at the end of the column. A further object is to provide an improved spray grid tray that is suitable for withdrawing gas from the column without unduly disturbing the uniformity of gas pressure over the cross-section of the tray, such tray being particularly useful for withdrawing a fraction of the ascending gas at an intermediate level of the column but also applicable at the end of the column.

In summary, according to the invention the spray grid tray column is provided at one or more levels thereof with a modified grid tray having one or more fluid basins that extend over only part of the tray area and are in flow communication with the body of fluid on one face of the spray grid of the respective tray at a plurality of points distributed over the tray area, the tray being provided with a spray grid that extends over at least a major part of and, preferably, all of the remaining part of the tray area and is made up of a plurality of closely spaced grid bars to provide narrow intervening slots, the basin being connected to a conduit that extends to a point outside of the column for admitting fluid to the basin or withdrawing fluid therefrom, depending upon the intended operation. The grid of the modified tray thereby functions as an operative spray grid tray, on which a body of liquid is built up by the upward flow of gas through the slots and above which a spray of liquid is formed, and from which liquid descends by flow through the slots. The grid preferably extends over a major part of the total tray area or cross-sectional area of the column and is advantageously located with the center of area of the grid substantially at the central axis of the column; for example, when a column of circular cross-section is used the grid may be a circle within an annular basin or an annulus surrounding a central circular basin, being in either case concentric with the outline of the tray as a whole, or the basins may be plural in number and distributed over the tray area with the grid occupying the portion of the tray in between the basins.

The basins are either upright or inverted, depending upon whether they are to contain liquid or gas, respectively, and may be either open or closed towards the top or bottom, respectively. For example, an upright basin for liquid may be open at the top to form a trough or may be closed on top and be in communication with the body of liquid that is retained on the upper face of the spray grid through a slot or perforation in the side of the basin. Similarly, an inverted basin for gas may be open or closed at the bottom, being in either case placed in communication with the body of gas that is retained by the lower side of the spray grid. The communication points between the basin and grid are distributed over the tray area, preferably sectorially so that fluid may be distributed onto the grid or withdrawn therefrom in a manner to maintain substantially uniform distribution of fluids on the tray among the various sectors thereof, as will be described in greater detail. The points of communication are advantageously located symmetrically with respect to one or more vertical planes passing through the center of area of the spray grid of the respective tray. In the case of basins intended to handle liquid it is advantageous to arrange the communication so that the liquid flows onto the grid with a radially inward velocity component so as to create a flow tending to increase the liquid depth slightly at the center; this counteracts the first of the abovementioned causes of maldistribution. For the same reason, it is desirable to withdraw the liquid from the grid near the periphery thereof.

The grid may be formed of a plurality of separate bars or any suitable cross-sectional shapes that are fastened together, e. g., by being welded to spacer bars, or the bars may be integral, e. g., by cutting slots into a tray plate.

Having described the purpose and nature of the invention in a general manner, the column will be described in detail by reference to the accompanying drawings forming a part of this specification which shows certain preferred illustrative embodiments, wherein.

Figures 1, 2, 3, 4:
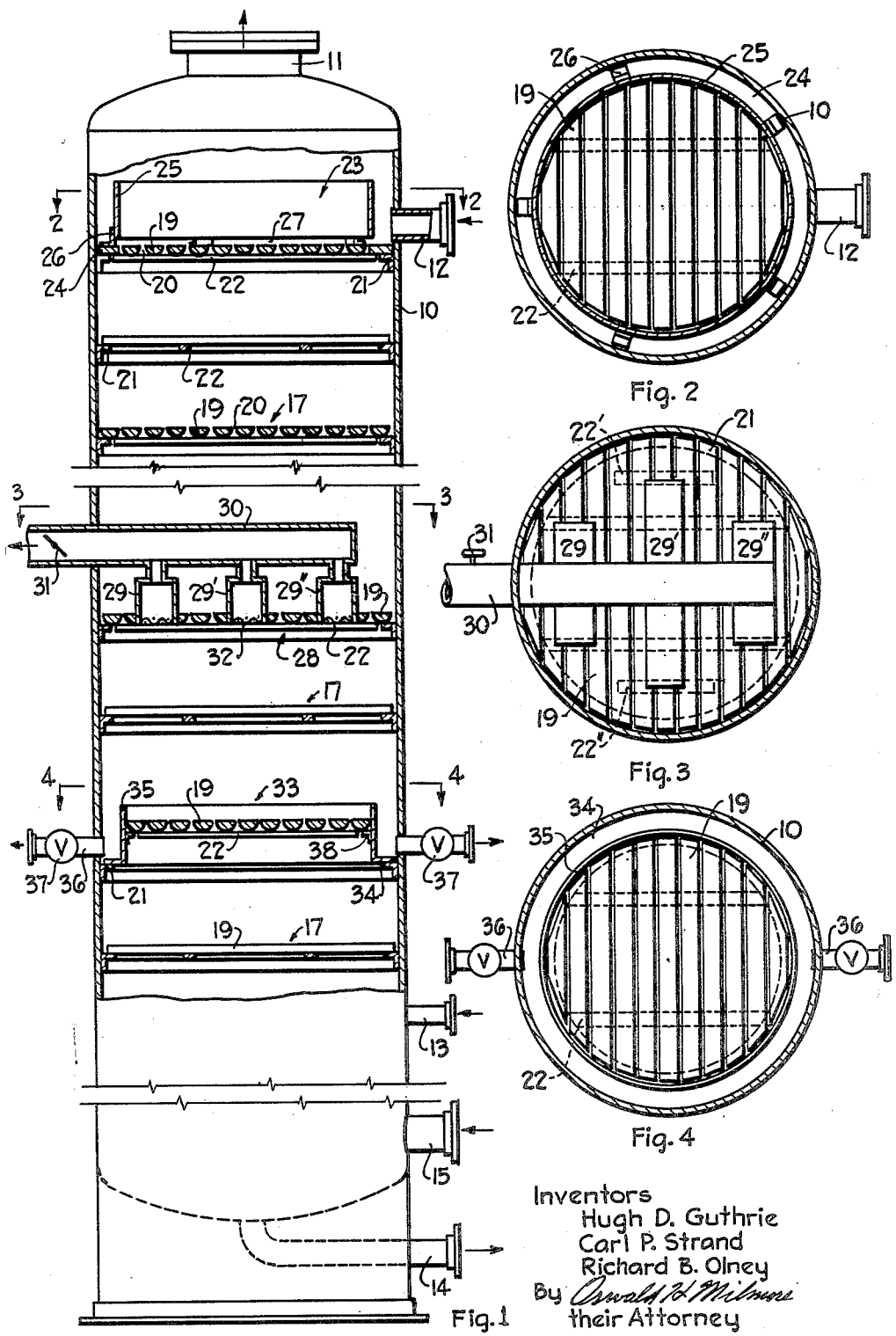
Fig. 1 is a vertical section view, partly in elevation, through a column equipped with various modified trays according to the invention.
Figs. 2-4 are transverse section views taken on correspondingly numbered lines on Fig. 1.

In the following description, certain grid trays are designated as feed trays and others as withdrawal trays. It should be noted that these appellations indicate only that the corresponding trays are particularly designed to perform the stated functions most effectively; in every case, except Figs. 5 and 6, however, the trays are operative, to various degrees of efficiencies, both for feeding a fluid and for withdrawing a fluid from the tray.

Referring to Figs. 1-4, there is shown a column 10 provided with three different types of modified operative grid trays for feeding liquid, for withdrawing liquid, and for withdrawing gas, respectively, these trays being shown together in a particular arrangement merely for purposes of illustration, it being understood that the invention contemplates, in various applications, the use in a column of only one of these trays, or of several trays of the same design or of different designs to perform different functions and located at various levels and in other relations in accordance with the process to be performed by the column.

The column 10 has closed upper and lower ends, a gas outlet 11 at the top, a top liquid inlet 12, an intermediate liquid inlet 13, a bottom liquid outlet 14 and a bottom gas inlet 15 some of which may in some cases be omitted or used for handling other fluids. For example, for distillation, heated vapors from a reboiler may be admitted through the inlet 15, but when the column is provided with a heating coil or internal reboiler vapors are generated within the column and this inlet may be omitted. Further, as applied to distillation, the mixture to be fractionated may be admitted through the intermediate inlet 13 or through one of the end inlets 12 or 15 as liquid or vapor; liquid reflux from a condenser may be admitted through the upper inlet 12 or formed within the column by mounting a partial condenser therein. The invention is not limited to any specific arrangement of the means for controlling the flow of fluids into and from the column and such controls are not shown, although it should be understood that suitable control means are provided.

The column has a plurality of transverse spray grid trays 17 arranged substantially horizontally and dividing the column into a vertical series of contacting stages in the form of spray spaces intermediate the trays. Each tray comprises a plurality of grid bars 19 of any suitable cross-section and extending in any desired configuration, spaced closely to provide a plurality of intervening slots 20. These slots should be distributed over the tray (or over the grid portion thereof when less than all is formed as a grid), and should have widths to cause all slots of the same tray to present substantially the same resistance to the upward passage of vapors per unit length of slot. In the particular case illustrated the grid bars are all of the same sizes and shapes, semi-circular in cross-section, disposed with the flat sides uppermost and coplanar and laid parallel to each other at equal intervals, whereby the slots have the same geometric shapes throughout each tray. The invention is not, however, concerned with the specific arrangement and shape of the bars, and other bars may be used.

The grid bars are supported on, e. g., welded to, annuli 21 that are secured to the column walls, and may be further welded to spacer bars 22 to maintain the grid bars in the desired relative positions. The slot widths at the narrowest parts thereof are normally between about 0.05 and 1.0 inch, depending upon the contemplated rates of liquid and gas flow, widths between 0.1 and 0.6 inch having been found to be the most useful. The bar widths are selected in relation to the slot widths so that the aggregate of the slot areas throughout the tray (herein referred to as the free area) is usually from about 7 to 25% of the total area of the grid when no downcomers are used, best results being obtained within the range 10 to 20%. In this case the area of the grid is the same as the cross-sectional area of the column. It should be understood that lower free areas may be used when the column is provided with downcomers for transferring liquid. When, as in the embodiment shown, the slots are of varying widths from top to bottom, the area is determined by the narrowest parts of the slots. For example, according to a preferred design, grid bars one inch in diameter are mounted with one quarter inch slots, resulting in a ratio of free area to total grid area of about 0.15 (taking into account the obstruction of the supporting structure).

For effective contacting it is important that the trays be spaced apart vertically to provide sufficient space for the upward flow of atomized liquid without substantial entrainment of liquid droplets by the gas flowing into the next higher tray. Too close a spacing limits the permissible gas rate and reduces the load point. It was found that the trays should normally be spaced apart at least about three times the bar widths, and spacing of from three to thirty inches are typical. The trays are advantageously oriented so that the grid bars extend at the right angles to the direction of the bars on the next higher tray, as shown in Fig. 1. This assists is maintaining good distribution throughout the column since surges of liquid across a tray normally grows parallel to the slots on that tray and consequently is dampened if transmitted to adjacent trays.

Considering now the modified trays according to the invention, the uppermost tray 23 is a liquid feed distributing tray and has an annular ring 24 at the periphery thereof which surrounds the spray grid, this grid thereby having an area that is slightly less than the grids of the trays 17 but being otherwise constructed as described above. An annular partition wall 25 is mounted in vertically spaced relation to the inner edge of the ring by supports 26 so as to form an annular basin between itself and the wall of the column 10, in communication with the conduit 12. The vertical spacing of the wall 25 is such as to provide an annular opening 27 of restricted height between the basin and the grid near to the latter, the restriction being useful both for isolating the current of liquid that flows circumferentially through the basin from the liquid on the tray and to insure that the liquid that flows through the opening has a sufficient radially inward velocity to direct the liquid to the center of the grid.

In operation, liquid supplied through the conduit 12 rises in the annular basin to a level somewhat in excess of the height of the body of liquid that is built up on the grid and flows radially inwardly, thereby distributing the liquid over the tray area. Perfectly uniform distribution of liquid on the tray under different operating conditions is not usually possible due to variations of liquid feed rate, and it is preferred to design the size of the annular opening 27 to promote a greater rather than a smaller supply of liquid to the center of the grid at the design feed rate in view of the above-mentioned tendency of the gas to ascend with slightly greater velocity near the center of the column.

The intermediate inlet pipe 13 may be connected to any suitable liquid distributor, such as a modified tray constructed like the tray 23.

The tray 28 is a gas withdrawal tray and has a plurality of inverted collecting basins 29, 29' and 29'' mounted on the spacer bars 22, the grid bars 19 being optionally omitted from the portions of the grid are occupied by these basins, as shown. Shorter auxiliary spacer bars 22' and 22'' may in this case be mounted near the ends of one or more of these basins, welded to the grid bars that extend fully across the tray, for supporting the ends of the shorter grid bars that lie beyond the ends of the basins. These basins are in communication at their tops with a discharge manifold 30 extending out through the column wall that may be provided with a flow control device, such as a damper 31. The inverted collecting basins are preferably wide enough to cause the collected gas, which enters at the bottom from the space beneath the grid, to flow up at a relatively low velocity, and are of sufficient height to permit entrained liquid drops to fall out. Liquid disengagement means, such as coalescing screens 32, may be mounted at the entrance to these basins for reducing the entry of liquid. It is evident that the basins 29-29'' are distributed so as to remove gas from a plurality of points along the margins of the basin, these points being distributed among the various sectors of the trays so as to maintain a relatively uniform pressure on the lower side of the tray, despite the removal of a large proportion of the ascending gas.

The tray 33 is a liquid withdrawal tray having a peripheral, annular upright collecting basin formed between the wall of the column 10 and a ring 34 that has an annular bottom resting on the support 21 and an upstanding flange rising to above the top of the grid bars 19 to form a weir 35. One or more discharge conduits 36 provided with flow control valves 37, are connected to the basin for withdrawal of a regulated quantity of liquid. The grid portion of the tray consists of parallel grid bars 19 supported by a ring 38 that is fixed to the inner wall of the ring 34, the bars being further positioned by spacer bars 22. It will be noted that the annular basin receives liquid from the tray along a circle that may be regarded as consisting of a multiplicity of points distributed symmetrically over the tray so that liquid is withdrawn uniformly by radially outward flow over the weir 35. While it is preferred to use a weir as shown, it should be understood that this weir is optional when the tray is used as a withdrawal tray and may in certain cases be omitted, particularly when a very deep basin is used, because the main purpose of the weir is to isolate the circumferential current of withdrawn liquid in the basin from the liquid on the grid. The weir height is preferably somewhat less, e. g., about half of the depth of the body of liquid that is built up on the tray during normal operation, whereby the weir operates as a submerged weir and the level of the liquid in the basin is only slightly lower than the liquid level on the grid. This tray may, however, also be used to maintain a liquid level in the basin that is materially lower than the liquid level on the grid by opening the valves 37, whereby the weir operates as an overflow weir.

It is evident that the trays 28 and 33 operate to withdraw fractional part of the ascending gas and descending liquid, respectively, and that the remaining parts of these fluids continue their course by flow through the slots in the respective grids.

Figure 5:
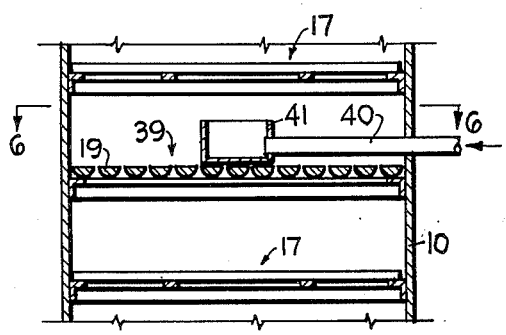
Figs. 5 and 6 are vertical and transverse section views, respectively, of a modified construction for feeding liquid, Fig. 6 being taken on the indicated section line on Fig. 5.
Figure 6:
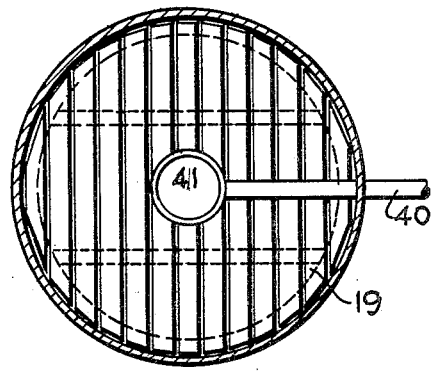

Figs. 5 and 6 show a modified construction of a liquid feed tray 39 wherein the liquid is supplied through a feed conduit 40 to a basin 41 resting on the grid bars 19 at the center of the tray, the height of the annular wall of the basin being slightly in excess of the level of the liquid body that is built up on the tray. The liquid overflows the basin and descends onto the grid, resulting in a somewhat greater depth of liquid near the center of the grid. This liquid is distributed uniformly in all radial directions by discharge at a multiplicity of points over the upper edge of the basin.

Figure 7:
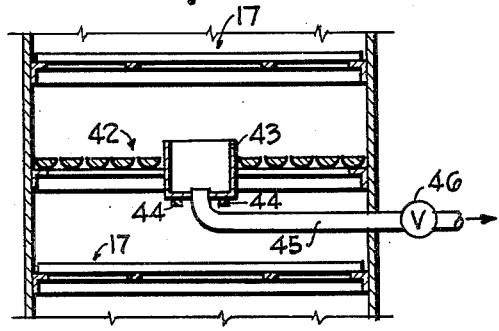
Fig. 7, is a fragmentary vertical section view of a variant of the embodiment according to Figs. 5 and 6 adapting the tray for withdrawing liquid.

Fig. 7 shows a modification of the arrangement of Figs. 5-6 adapting the tray for withdrawal of liquid. This tray 42 differs from tray 39 primarily in that the central basin 43 is lower so that the upper edge thereof is not above the level of the body of liquid on the tray. The basin is supported on cross bars 44 and is provided with a discharge conduit 45 having a valve 46 for the withdrawal of regulated quantities of liquid that flows into the basin over the rim thereof.

Figure 8:
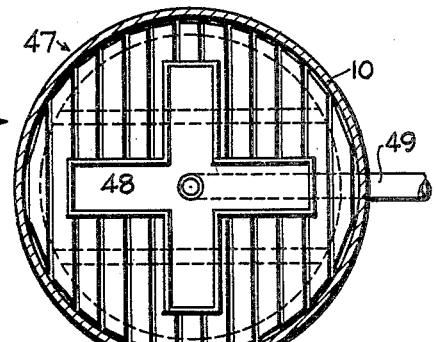
Fig. 8 is a plan view of a tray suitable for feeding or withdrawing liquid showing a modified geometric arrangement.

The distributing and collecting basins may take any desired geometrical arrangement. Particularly in the case of columns with large cross-sectional areas, it is desirable to place the basin into communication with the gas or liquid at the tray not only near the periphery or center, but at intermediate points which are also distributed sectorially over the tray area. By way of example, Fig. 8 shows such an arrangement, wherein the modified grid tray 47 has a cruciform basin 48 connected to a conduit 49 that leads to the outside of the column 10. The vertical walls of the basin may extend above the grid to any desired level, for example as shown in Fig. 5 or 7, depending upon whether it is to be used to feed or withdraw liquid from the tray. This basin communicates with the space above the spray grid at points that are distributed both radially and sectorially.

Figure 9:
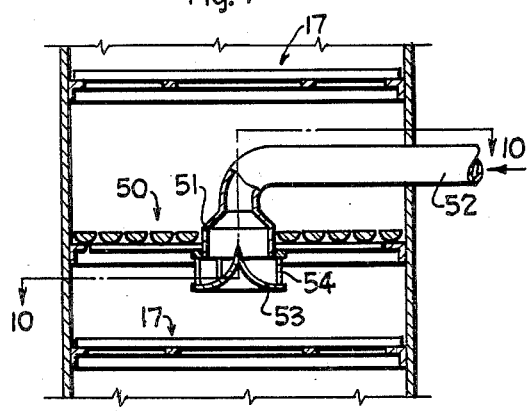
Figs. 9 and 10 are vertical and transverse section views, respectively, of a modified construction for feeding gas, Fig. 10 being taken on the indicated broken section line on Fig. 9.
Figure 10:
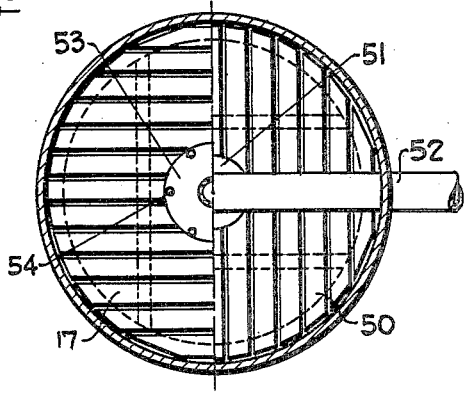

Figs. 9 and 10 show a modified construction of a gas feed grid tray 50 having a central inverted basin 51 connected to a gas supply pipe 52, the basin being diametrically enlarged to reduce the gas velocity. The lower opening of the basin has a deflector 53 supported by tie rods 54 to deflect the entering gas radially outwards along the lower face of the grid and, incidentally, to reduce interference of the ascending gas from the adjacent lower grid tray 17 with the uniform distribution of the gas.

As used in this specification, the term gas includes vapor.

We claim as our invention:

1. In a contacting device for effecting contact between counter-flowing fluids of which one is an ascending gas and the other is a descending liquid, the combination of: an upright vessel; a plurality of transverse spray grid trays on the upper face of each of which is retained a body of liquid and on the lower face of each of which is retained a body of gas, said trays being spaced apart vertically to divide said vessel into a plurality of spray spaces forming contact stages wherein the gas and liquid are intimately contacted by atomization of said body of liquid into droplets sprayed upwardly by the action of said gas, said spray grid trays comprising a plurality of grid bars closely spaced apart to provide a plurality of narrow slots for the upward flow of gas and the downward flow of liquid, the upper parts of the several bars being at a common level; at least one of said trays having at least one fluid basin in close proximity to the level of the bars extending over only a part of the tray area and the spray grid thereof extending over another part of said area, said basin being in fluid flow communication with the body of fluid retained on one of said faces of the respective spray grid at a plurality of points distributed over the tray area and said tray being open for the downward flow of said liquid, after traversing the slots thereof, directly onto the tray next below distributed over the tray area; and conduit means connected to said fluid basin.

2. A contacting device according to claim 1 wherein the said one tray has the center of area of the spray grid thereof substantially at the center of area of the tray as a whole and the said points at which the spray grid and the basin are in communication are distributed symmetrically with respect to a vertical plane through the center of the spray grid.

3. A contacting device according to claim 1 wherein the basin is upright for retaining liquid and is in liquid flow communication with the space above the spray grid of the respective tray.

4. A contacting device according to claim 3 wherein the basin is annular in shape and surrounds at least a part of the spray grid and is separated from said grid by a wall extending to a height in excess of the level of said body of liquid retained on the grid, said wall having a restricted opening at a plurality of sectorially distributed points for the flow of liquid radially inwardly from the basin onto the tray.

5. A contacting device according to claim 3 wherein the basin extends beneath the level of the spray grid thereof.

6. A contacting device according to claim 1 wherein the basin is inverted for retaining gas and is in gas flow communication with the space beneath the spray grid of the respective tray.

7. A contacting device according to claim 6 wherein the basin is open downwardly and provided with a screen across the opening.

8. A contacting device according to claim 6 wherein the basin is disposed centrally with respect to the tray, is open downwardly, and has a deflector at the bottom thereof centered for deflecting the gas uniformly among different sectors of the grid.

9. A contacting device according to claim 1 wherein the basin or basins are in communication with the spray grid of the respective tray at a plurality of points at different radial distances from the center of the tray.

10. In a contacting device for effecting contact between counterflowing fluids of which one is an ascending gas and the other is a descending liquid, the combination of: an upright vessel; a plurality of transverse spray grid trays on the upper face of each of which is retained a body of liquid and on the lower face of each of which is retained a body of gas, said trays being spaced apart vertically to divide said vessel into a plurality of spray spaces forming contact stages wherein the gas and liquid are intimately contacted by atomization of said body of liquid into droplets sprayed upwardly by the action of said gas, said spray grid trays comprising a plurality of grid bars closely spaced apart to provide a plurality of narrow slots for the upward flow of gas and the downward flow of liquid; at least one of said trays having at least one upright liquid basin extending over only a part of the tray area and the spray grid thereof extending over another part of said area, said basin being separated from the spray grid by a weir having parts thereof distributed over the tray area and extending above the level of said grid to a height not in excess of the level of said body of liquid retained on the grid, for the flow of liquid over said weir at said distributed points between the grid and the basin; and conduit means connected to said liquid basin.

11. In a contacting device for effecting contact between counterflowing fluids of which one is an ascending gas and the other is a descending liquid, the combination of: an upright vessel; a plurality of transverse spray grid trays on the upper face of each of which is retained a body of liquid and on the lower face of each of which is retained a body of gas, said trays being spaced apart vertically to divide said vessel into a plurality of spray spaces forming contact stages wherein the gas and liquid are intimately contacted by atomization of said body of liquid into droplets sprayed upwardly by the action of said gas, said spray grid trays comprising a plurality of grid bars closely spaced apart to provide a plurality of narrow slots for the upward flow of gas and the downward flow of liquid, the upper parts of the several bars of the same tray being substantially at a common level, said narrow slots constituting the only passageway for the flow of liquid or gas through the tray; at least one of said trays having a fluid supply basin in close proximity to the level of the bars extending over only a part of the tray area and the spray grid thereof extending over another part of said area, said basin being in fluid flow communication with the body of fluid retained on one of said faces of the respective spray grid at a plurality of points distributed over the tray area to distribute fluid substantially uniformly to said grid among different portions of the grid and said tray being open for the downward flow of liquid, after traversing the slots thereof, directly onto the tray next below distributed over the tray area; and a fluid supply conduit for supplying the said fluid to the basin.

12. In a contacting device for effecting contact between counter-flowing fluids of which one is an ascending gas and the other is a descending liquid, the combination of: an upright vessel; a plurality of transverse spray grid trays on the upper face of each of which is retained a body of liquid and on the lower face of each of which is retained a body of gas, said trays being spaced apart vertically to divide said vessel into a plurality of spray spaces forming contact stages wherein the gas and liquid are intimately contacted by atomization of said body of liquid into droplets sprayed upwardly by the action of said gas, said spray grid trays comprising a plurality of grid bars closely spaced apart to provide a plurality of narrow slots for the upward flow of gas and the downward flow of liquid, the upper parts of the several bars of the same tray being substantially at a common level, said narrow slots constituting the only passageway for the flow of liquid or gas through the tray; at least one of said trays at an intermediate level of the vessel having a fluid collecting basin extending over only a part of the tray area and the spray grid thereof extending over another part of said area, said basin being in fluid flow communication with the body of fluid retained on one of said faces of the respective tray at a plurality of points distributed over the tray area to withdraw a fraction of the fluid from the said grid while leaving a remaining fraction thereof substantially uniformly distributed among different portions of said grid and said tray being open for the downward flow of liquid, after traversing the slots thereof, directly onto the tray next below distributed over the tray area; and a fluid withdrawal conduit for withdrawing fluid from said basin.

13. In a contacting device for effecting contact between counter-flowing fluids of which one is an ascending gas and the other is a descending liquid, the combination of: an upright vessel; a plurality of transverse, substantially horizontal spray grid trays on the upper face of which is retained a body of liquid and on the lower face of which is retained a body of gas, said trays being spaced apart vertically to divide said vessel into a plurality of spray spaces forming contact stages wherein the gas and liquid are intimately contacted by atomization of said body of liquid into droplets sprayed upwardly from the trays by the action of said gas, said spray grid trays comprising a plurality of parallel grid bars closely spaced to provide a plurality of narrow, elongated slots having widths of from about 0.05 to 1.0 inch and aggregate free areas between about 7% and 25% of the area of the grid, said slots being substantially uniformly distributed over the area of the tray, having widths to offer substantially the same resistance to the passage of gas per unit length of slot and constituting the only passageway for the upward flow of gas and the downward flow of liquid through the tray, said trays being spaced vertically at least three times the width of the grid bars; at least one of said trays having at least one fluid basin extending over only a minor part of the tray and the spray grid thereof extending over another, major part of said area, said basin being in fluid flow communication with the body of fluid retained on one of said faces of the respective spray grid at a plurality of points distributed sectorially over the tray area; and conduit means connecting said fluid basin to a point outside of the vessel.

14. As a subcombination; a spray grid tray for gas and liquid contact columns having a fluid basin extending over a part of the area thereof and a spray grid extending over another part of said area, said grid comprising a plurality of grid bars closely spaced to provide a plurality of narrow slots for the upward flow of gas and the downward flow of liquid, said bars having the upper parts thereof substantially in a common horizontal plane for retaining a body of liquid thereon and said tray being open for the downward flow of liquid, after traversing the slots thereof, directly onto the tray next below distributed over the tray area, said basin being closed at least at one vertical limit thereof and being in fluid flow communication with space at the face of the said grid that is opposite to said vertical limit at a plurality of points distributed over said grid.

15. As a subcombination, a spray grid tray having an annulus shaped to form the bottom of an upright basin; a spray grid within said annulus comprising a plurality of grid bars closely spaced to provide a plurality of narrow slots for the upward flow of gas and the downward flow of liquid, said bars having the upper parts thereof substantially in a common horizontal plane for retaining a body of liquid thereon and said tray being open for the downward flow of liquid, after traversing the slots thereof, directly onto the tray next below distributed over the tray area; and an annular wall at the periphery of said spray grid extending upwardly from said annulus and providing a restricted, circumferentially distributed passageway near the upper face of said grid between the annular space outside of the wall and the space inside of the wall.

16. As a subcombination, a spray grid tray having an annulus shaped to form the bottom of an upright basin; an annular wall rising from a radially inner part of said annulus to form an upright wall of said basin; and a spray grid within said annular wall comprising a plurality of grid bars closely spaced to provide a plurality of narrow slots for the upward flow of gas and the downward flow of liquid, said bars having the upper parts thereof substantially in a common horizontal plane for retaining a body of liquid thereon and said tray being open for the downward flow of liquid, after traversing the slots thereof, directly onto the tray next below distributed over the tray area, said wall extending a short distance above the level of the tops of said grid bars to form a weir for the flow of liquid between said basin and said grid over the weir.

17. As a subcombination, a spray grid tray having an upright liquid basin extending over a minor part of the area thereof and a spray grid extending over another, major part of said area, said basin being in liquid flow communication with the space at the upper face of said spray grid at a plurality of points distributed sectorially over the area of said grid, said grid comprising a plurality of grid bars closely spaced to provide a plurality of narrow slots for the upward flow of gas and the downward flow of liquid, said bars having the upper parts thereof substantially in a common horizontal plane for retaining a body of liquid thereon and said tray being open for the downward flow of liquid, after traversing the slots thereof, directly onto the tray next below distributed over the tray area.

18. As a subcombination, a spray grid tray having an inverted basin for gas extending over a minor part of the area thereof and a spray grid extending over another, major part of said area, said basin being in gas flow communication with the space at the lower face of said spray grid at a plurality of points distributed sectorially over the area of said grid, said grid comprising a plurality of grid bars closely spaced to provide a plurality of narrow slots for the upward flow of gas and the downward flow of liquid, said bars having the upper parts thereof substantially in a common horizontal plane for retaining a body of liquid thereon and said tray being open for the downward flow of liquid, after traversing the slots thereof, directly onto the tray next below distributed over the tray area.

19. The spray grid tray according to claim 18 wherein the tray has a plurality of basins interconnected by a manifold conduit.

20. The spray grid tray according to claim 18 wherein the basin is located centrally within the tray area.

References Cited in the file of this patent

UNITED STATES PATENTS

| Number | Name | Date |
|---|---|---|
| 1,811,627 | Heid | June 23, 1931 |
| 1,897,766 | Primrose | Feb. 14, 1933 |
| 1,929,403 | Byer | Oct. 10, 1933 |
| 1,937,958 | Huff | Dec. 5, 1933 |
| 1,981,989 | Byer | Nov. 27, 1934 |
| 1,989,033 | Weir | Jan. 22, 1935 |
| 2,010,010 | Chillas | Aug. 6, 1935 |
| 2,052,994 | Watts | Sept. 1, 1936 |
| 2,070,100 | Twomey | Feb. 9, 1937 |
| 2,080,713 | Hayes | May 18, 1937 |
| 2,428,922 | Shoresman | Oct. 14, 1947 |

FOREIGN PATENTS

| Number | Country | Date |
|---|---|---|
| 618,029 | Great Britain | Feb. 15, 1949 |
| 885,548 | France | May 31, 1943 |